United States Patent
Katebi et al.

(10) Patent No.: US 12,352,656 B2
(45) Date of Patent: Jul. 8, 2025

(54) SYSTEMS, METHODS, AND COMPUTER PROGRAM PRODUCTS FOR RECURSIVE HYPESPECTRAL IMAGING

(71) Applicant: Rebellion Photonics, Inc., Houston, TX (US)

(72) Inventors: Reza Katebi, Decatur, GA (US); Mohammad Lotfollahi Sohi, Houston, TX (US); Chuan Zhao, Sugar Land, TX (US); Patrick Charles O'Driscoll, Houston, TX (US)

(73) Assignee: Rebellion Photonics, Inc., Houston, TX (US)

( * ) Notice: Subject to any disclaimer, the term of this patent is extended or adjusted under 35 U.S.C. 154(b) by 0 days.

(21) Appl. No.: 18/482,624

(22) Filed: Oct. 6, 2023

(65) Prior Publication Data

US 2024/0102878 A1  Mar. 28, 2024

Related U.S. Application Data

(63) Continuation of application No. 17/576,217, filed on Jan. 14, 2022, now Pat. No. 11,815,427.

(51) Int. Cl.
| | | |
|---|---|---|
| *G01M 3/04* | (2006.01) | |
| *G06T 7/00* | (2017.01) | |
| *H04N 23/90* | (2023.01) | |

(52) U.S. Cl.
CPC .......... *G01M 3/04* (2013.01); *G06T 7/97* (2017.01); *H04N 23/90* (2023.01); *G06T 2207/10048* (2013.01)

(58) Field of Classification Search
CPC ..................................... G06T 7/11; G06T 7/97
See application file for complete search history.

(56) References Cited

U.S. PATENT DOCUMENTS 10,810,858 B2   10/2020   Israelsen
2019/0003984 A1*  1/2019  Kester .................. G01J 3/28
(Continued)

FOREIGN PATENT DOCUMENTS

CN   111007018 A   4/2020
EP   3462413 B1   11/2020

OTHER PUBLICATIONS

European search report Mailed on Jun. 16, 2023 for EP Application No. 22214171, 8 page(s).

(Continued)

*Primary Examiner* — Jayanti K Patel
*Assistant Examiner* — Christopher Kingsbury Glover
(74) *Attorney, Agent, or Firm* — Alston & Bird LLP

(57) ABSTRACT

Systems, methods, and computer program products for recursive modifications are provided. An example imaging system includes a first infrared (IR) imaging device that generates first IR image data of a first field of view of the first IR imaging device at a first time and a computing device operably connected with the first IR imaging device. The computing device receives the first IR image data from the first IR imaging device and determines a first set of pixels and a second set of pixels from amongst a plurality of pixels associated with the first IR image data. The computing device further determines a first modification protocol for the first set of pixels and determines a second modification protocol for the second set of pixels. In response, the computing device generates a recursive modification input based upon the first and second modification protocols.

20 Claims, 5 Drawing Sheets

(56) References Cited

U.S. PATENT DOCUMENTS

| | | | |
|---|---|---|---|
| 2019/0101490 A1* | 4/2019 | Wang | G06T 7/0004 |
| 2019/0137388 A1* | 5/2019 | Mallery | G01J 5/0806 |
| 2019/0162657 A1 | 5/2019 | Wang et al. | |
| 2019/0302013 A1 | 10/2019 | Wang | |
| 2019/0340914 A1* | 11/2019 | Israelsen | G01M 3/04 |
| 2020/0124525 A1 | 4/2020 | Kester et al. | |
| 2021/0037197 A1 | 2/2021 | Kester et al. | |
| 2021/0310941 A1 | 10/2021 | Sandsten et al. | |
| 2024/0071191 A1* | 2/2024 | Mullins | G08B 13/19613 |

OTHER PUBLICATIONS

Non-Final Rejection Mailed on Feb. 15, 2023 for U.S. Appl. No. 17/576,217.

Notice of Allowance and Fees Due (PTOL-85) Mailed on Jul. 6, 2023 for U.S. Appl. No. 17/576,217, 5 page(s).

EP Office Action Mailed on Apr. 16, 2024 for EP Application No. 22214171, 4 page(s).

\* cited by examiner

SYSTEMS, METHODS, AND COMPUTER PROGRAM PRODUCTS FOR RECURSIVE HYPESPECTRAL IMAGING

CROSS-REFERENCE TO RELATED APPLICATIONS

This patent application is a continuation of U.S. patent application Ser. No. 17/576,217, filed Jan. 14, 2022, which is incorporated herein by reference in its entirety.

TECHNOLOGICAL FIELD

Example embodiments of the present disclosure relate generally to imaging systems and, more particularly, to hyperspectral and/or infrared (IR) imaging to detect and quantify gas leakages.

BACKGROUND

In many environments, such as manufacturing facilities, drilling locations, pipelines, and/or the like, gases may be used, stored, transferred, moved, etc. For example, a natural gas pipeline may transport natural gas (e.g., methane and/or the like) between locations. During transport, some gas may be emitted from such an example pipeline, such as due to a leak in the pipeline system (e.g., due to poor sealing at pipe junctions, an impact with the pipeline, etc.). In order to identify a leak and/or quantify the amount of gas emitted (e.g., a fugitive emission) from the leak, hyperspectral cameras may be used. The inventors have identified numerous deficiencies with the existing technologies in this field, the remedies for which are the subject of the embodiments described herein.

BRIEF SUMMARY

As described above, many industries and environments rely upon or otherwise leverage gases in performing various operations associated with these industries. For example, the natural gas industry may extract, transport, and process natural gas (e.g., methane and/or the like) for subsequent use in generating heat, generating electricity, fueling vehicles, etc. The emittance of this gas to an external environment, such as due to a leak in one or more systems, may result in large costs in lost product as well as the potential for large fines from, for example, governmental regulatory agencies. Furthermore, the leakage of gases such as methane may present a dangerous condition to workers or otherwise impact workplace safety. As such, the accurate detection and quantification of gas leakages (e.g., a leaking plume of gas) is of critical importance in order to maximize profit while preventing hazardous conditions.

In infrared, hyperspectral, and/or thermal imaging applications used to detect or quantify gas leaks, the temperature associated with a particular location within the image (e.g., represented by one or more pixels) may account for the temperature of any location, object, fluid, gas, etc. present or otherwise associated with this pixel. Said differently, temperature values or data associated with a particular pixel are influenced by the temperature at each location along a line extending from the imaging device to the limit of the device's resolution. An infrared (IR) imaging device or camera may determine a temperature for a particular pixel that is influenced by, for example, a leaking gas captured by the camera and associated with the particular pixel as well as the temperature of the foreground/background of the pixel. As such, the temperature of an example background may operate to influence the ability of the camera to properly quantify the presence or amount of gas at a particular location.

These detection and quantification operations are further complicated in instances in which the imaging system moves, pans, tilts, or otherwise alters the field of view of the imaging devices leveraged by the imaging system. For example, an imaging device (e.g., hyperspectral and/or IR camera) may pan and/or tilt such that the image data generated by this device (e.g., indicative of an associated FOV of the device) changes. Gas within the FOV of this device (e.g., a fugitive emission or otherwise), however, may traditionally be included in the determination or estimation of the foreground/background associated with particular pixels. Said differently, conventional systems fail to properly account for the impact of gas that may potentially exist in a particular FOV (e.g., gas burn into background) in initial determinations resulting in the inability to properly detect and/or quantify fugitive emissions with such a FOV, particularly when an imaging device's FOV is modified. For example, conventional systems may fail to account for "burn in" in which unintended properties associated with the foreground/background of an image are "burned into" the outputs of the imaging system To solve these issues and others, example implementations of embodiments of the present disclosure may leverage infrared (IR) imaging devices, such as those implemented in a hyperspectral camera implementation, as well as modification protocols so as to generate a recursive modification input for iterative spectral absorption data generation. For example, an example imaging system may generate IR image data at a first time that is analyzed to determine various sets of pixels from amongst the pixels associated with the IR image data. Distinct or interrelated modification protocols are determined for each set of pixels, and a recursive modification input may further be generated based upon these modifications protocols for iteratively generating spectral absorption data by the imaging system. For example, a first set of pixels may be indicative or otherwise associated with the presence of a detection gas such that the rate at which IR image data is used to replace or otherwise update these pixels is different than a rate at which IR image data is used to replace or otherwise update other pixels (e.g., a second set of pixels). In doing so, the embodiments of the present disclosure may account for the evolving environmental or ambient conditions proximate a gas leak (e.g., fugitive emission) and the repositioning of the imaging system so as to accurately ascertain and quantify the detection gas observed by these systems (e.g., IR camera, hyperspectral camera, etc.).

Apparatuses, methods, systems, devices, and associated computer program products are provided for recursive modification generation for hyperspectral imaging applications. An example imaging system may include a first infrared (IR) imaging device configured to generate first IR image data of a first field of view of the first IR imaging device at a first time; and a computing device operably connected with the first IR imaging device. The computing device may be configured to receive the first IR image data from the first IR imaging device, determine a first set of pixels from amongst a plurality of pixels associated with the first IR image data, and determine a second set of pixels from amongst the plurality of pixels associated with the first IR image data. Each pixel in the first set of pixels may include first IR image data indicative of the presence of a detection gas, and each pixel in the second set of pixels may include first IR image data indicative of the absence of the detection gas. The computing device may be configured to further determine a first modification protocol for the first set of pixels, determine a second modification protocol for the second set of pixels, and generate a recursive modification input based upon the first modification protocol and the second modification protocol.

In some embodiments, the computing device may be further configured to generate spectral absorption data based upon the first IR image data at the first time.

In some embodiments, the computing device may be further configured to receive first IR image data of the first field of view of the first IR imaging device at a second time, and generate spectral absorption data based upon the recursive modification input and the first IR image data at the second time.

In some embodiments, the computing device may be further configured to iteratively generate the recursive modification input for iterative generation of spectral absorption data based upon the iteratively generated recursive modification input and the iteratively generated first IR image data.

In some embodiments, the first modification protocol may define a rate at which the IR image data for the one or more pixels in the first set of pixels is replaced, and the second modification protocol may define a rate at which the IR image data for the one or more pixels in the second set of pixels is replaced.

In some further embodiments, the rate defined by the first modification protocol may be less frequent than the rate defined by the second modification protocol.

In some embodiments, the imaging system may further include a second IR imaging device configured to generate second IR image data of a field of view of the second IR imaging device at the first time and operably connected with the computing device. In such an embodiment, the computing device may be further configured to generate spectral absorption data based upon the first IR image data at the first time and the second IR image data at the first time.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
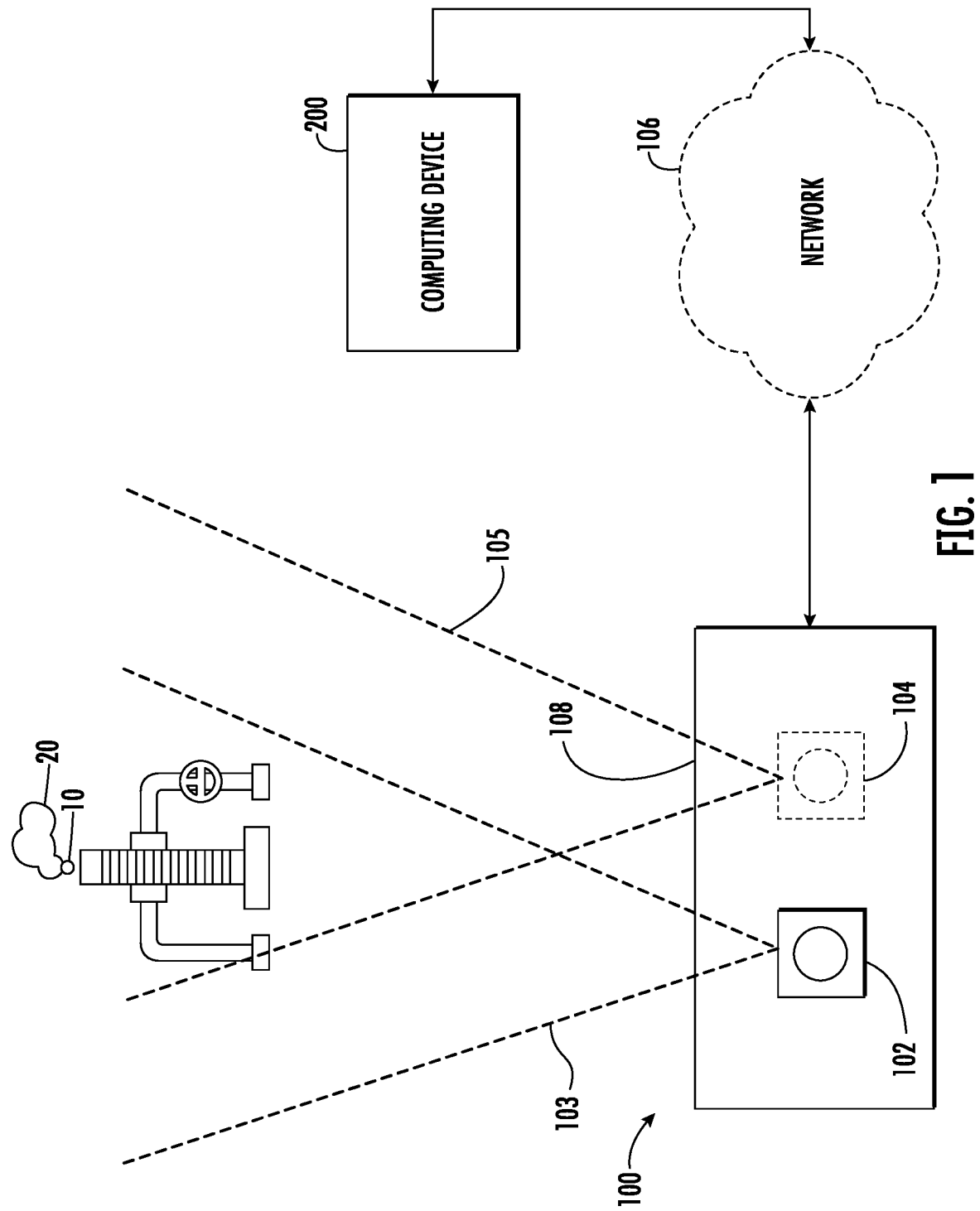
FIG. 1 illustrates an example imaging system in operation with emission sources, in accordance with some example embodiments described herein.

Some embodiments of the present disclosure will now be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a computing device of an example imaging system as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first device is described herein to receive data from a second device, it will be appreciated that the data may be received directly from the second device or may be received indirectly via one or more intermediary computing devices, such as, for example, one or more servers, relays, routers, network access points, base stations, hosts, and/or the like, sometimes referred to herein as a "network." Similarly, where a first device is described herein as sending data to a second device, it will be appreciated that the data may be sent directly to the second device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "first IR imaging device" or "first IR imager" refer to a device or devices capable of generating first IR image data. Example first IR imaging devices may include a thermal imaging camera, an IR imager, an IR camera, a thermographic camera, and/or the like that may generate IR image data indicative of a field of view (FOV) of the first IR imaging device. Said differently, the first IR imaging device may include any device, apparatus, system, etc. capable of detecting infrared energy/radiation and converting said infrared energy/radiation into a corresponding electronic signal (e.g., first IR image data). By way of a non-limiting example, the first IR imaging device may include an IR camera configured to capture IR energy emitted by a fugitive emission from an example emission source as described hereafter located within a first FOV associated with the first IR imaging device. The first IR imaging device may also be associated with a first filter that defines a first band-pass frequency (e.g., a device that passes frequencies within a certain range and attenuates frequencies outside this range). As described hereafter, this first filter may be configured to pass IR radiation having a frequency associated with the fugitive emission (e.g., the detection gas) for which the imaging device is design to monitor (e.g., methane or the like) to the first IR imaging device.

As used herein, the terms "second IR imaging device" or "second IR imager" refer to a device or devices capable of generating second IR image data. Example second IR imaging devices may also include a thermal imaging camera, an IR imager, an IR camera, a thermographic camera, and/or the like that may generate IR image data indicative of a field of view (FOV) of the second IR imaging device. Said differently, the second IR imaging device may include any device, apparatus, system, etc. capable of detecting infrared energy/radiation and converting said infrared energy/radiation into a corresponding electronic signal (e.g., second IR image data). By way of a non-limiting example, the second IR imaging device may also include an IR camera configured to capture IR energy emitted by a fugitive emission from an example emission source as described hereafter located within a second FOV associated with the second IR imaging device. The second IR imaging device may also be associated with a second filter that defines a second band-pass frequency (e.g., a device that passes frequencies within a certain range and attenuates frequencies outside this range). As described hereafter, this second filter may be configured to pass IR radiation having a frequency associated with the fugitive emission (e.g., detection gas) for which the imaging device is design to monitor (e.g., methane or the like) to the second IR imaging device and may further be configured for use with the same frequency as the first filter. Although described herein with refence to two (2) IR imaging devices, the present disclosure contemplates that the imaging system may include any number of IR imaging devices based upon the intended application of the imaging system.

As used herein, the term "computing device" refers to any user device, controller, object, or system which may be in physical or network communication with a first IR imaging device and/or a second IR imaging device as described hereafter. For example, the computing device may refer to a wireless electronic device configured to perform various IR image related operations in response to first IR image data and/or second IR image data generated by the first IR imaging device and the second IR imaging device, respectively. The computing device may be configured to communicate with the first IR imaging device and/or the second IR imaging device via Bluetooth, NFC, Wi-Fi, 3G, 4G, 5G protocols, and the like. In some instances, the computing device may comprise the first IR imaging device and/or the second IR imaging device (e.g., an integrated configuration).

As used herein, the terms "fugitive emission," "gas leak," "gas plume," "detection gas," and/or "gas leak plume" may refer to a collection of gas atoms or particles that include vast separation between individual atoms or particles. Such a gas may leak or otherwise be emitted from a containing vessel (e.g., natural gas pipeline or the like) or an emission source and may be formed as a plume or column. This plume may be a vertical body of a first fluid (e.g., the leaking gas) moving relative or through another second fluid (e.g., the ambient air). As would be evident in light of the present disclosure, the intensity of the gas may dissipate as the distance between the leaking gas and the source of the leak increases. For example, a gas leak from a pipeline that contains methane gas may result in a gas plume of methane gas emitted from the pipeline such that the intensity (e.g., concentration) of methane gas decreases as the distance between the particles of methane gas and the location of the leakage increases. Although described herein with reference to an example methane gas application, the present disclosure contemplates that the imaging system(s) described herein may be configured for use with detection gas of any type, concentration, etc.

As used herein, the term "computer-readable medium" refers to non-transitory storage hardware, non-transitory storage device or non-transitory computer system memory that may be accessed by a computing device, a microcomputing device, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example imaging system 100 is illustrated with a first IR imaging device 102 and a second IR imaging device 104 operably coupled with a computing device 200 via a network 106. As defined above, the first IR imaging device 102 may comprise a device capable of generating first IR image data and may be a thermal imaging camera, an IR imager, an IR camera, a thermographic camera, and/or the like. The first IR imaging device 102 may be associated with a FOV 103. The FOV 103 may refer to the observable area within which the first IR imaging device 102 may capture images (e.g., generate first IR image data). As described hereafter, in some embodiments, the first IR imaging device 102 may be positioned or oriented such that an emission source 10 is physically located within the FOV 103 of the first IR imaging device 102. Said differently, the FOV 103 of the first IR imaging device 102 may be such that first IR image data generated by the first IR imaging device 102 (e.g., captured IR images of the FOV 103) may include IR image data indicative of or otherwise associated with the emission source 10. The present disclosure contemplates that the first IR imaging device 102 may be positioned at any physical location and at any orientation based upon the intended application of the system 100 and that the location at which the first IR imaging device 102 is directed may similarly change during operation. Furthermore, the present disclosure contemplates that the FOV 103 may be varied based upon the operating parameters of the first IR imaging device 102.

In some embodiments, the imaging system 100 may include a second IR imaging device 104 that may comprise a device capable of generating second IR image data and may be a thermal imaging camera, an IR imager, an IR camera, a thermographic camera, and/or the like. The second IR imaging device 104 may be associated with a FOV 105. The FOV 105 may refer to the observable area within which the second IR imaging device 104 may capture images (e.g., generate second IR image data). As described hereafter, in some embodiments, the second IR imaging device 104 may be positioned or oriented such that an emission source 10 is physically located within the FOV 105 of the second IR imaging device 104. Said differently, the FOV 105 of the second IR imaging device 104 may be such that second IR image data generated by the second IR imaging device 104 (e.g., captured IR images of the FOV 105) may include IR image data indicative of or otherwise associated with the emission source 10. The present disclosure contemplates that the second IR imaging device 104 may be positioned at any physical location and at any orientation based upon the intended application of the system 100. Furthermore, the present disclosure contemplates that the FOV 105 may be varied based upon the operating parameters of the second IR imaging device 104. As would be evident in light of the present disclosure, the first FOV 103 and the second FOV 105 may be different based upon the different positions of the respective first IR imaging device 102 and second IR imaging device 104. In other embodiments, the first FOV 103 and the second FOV 105 may at least partially overlap or coincide.

In some embodiments as described herein, the first IR imaging device 102 and the second IR imaging device 104 may be formed as an integral device or may be otherwise commonly housed, such as via housing 108 of a hyperspectral camera. In such an embodiment, the FOV 103 and the FOV 105 may, for example, at least partially overlap as described above. In other embodiments, the first IR imaging device 102 and the second IR imaging device 104 may be separately located. In any embodiment, the present disclosure contemplates that the FOV 103 and/or the FOV 105 may be dynamically adjusted (e.g., tilted, panned, pivoted, etc.) during performance of the operations described herein.

Figure 3:
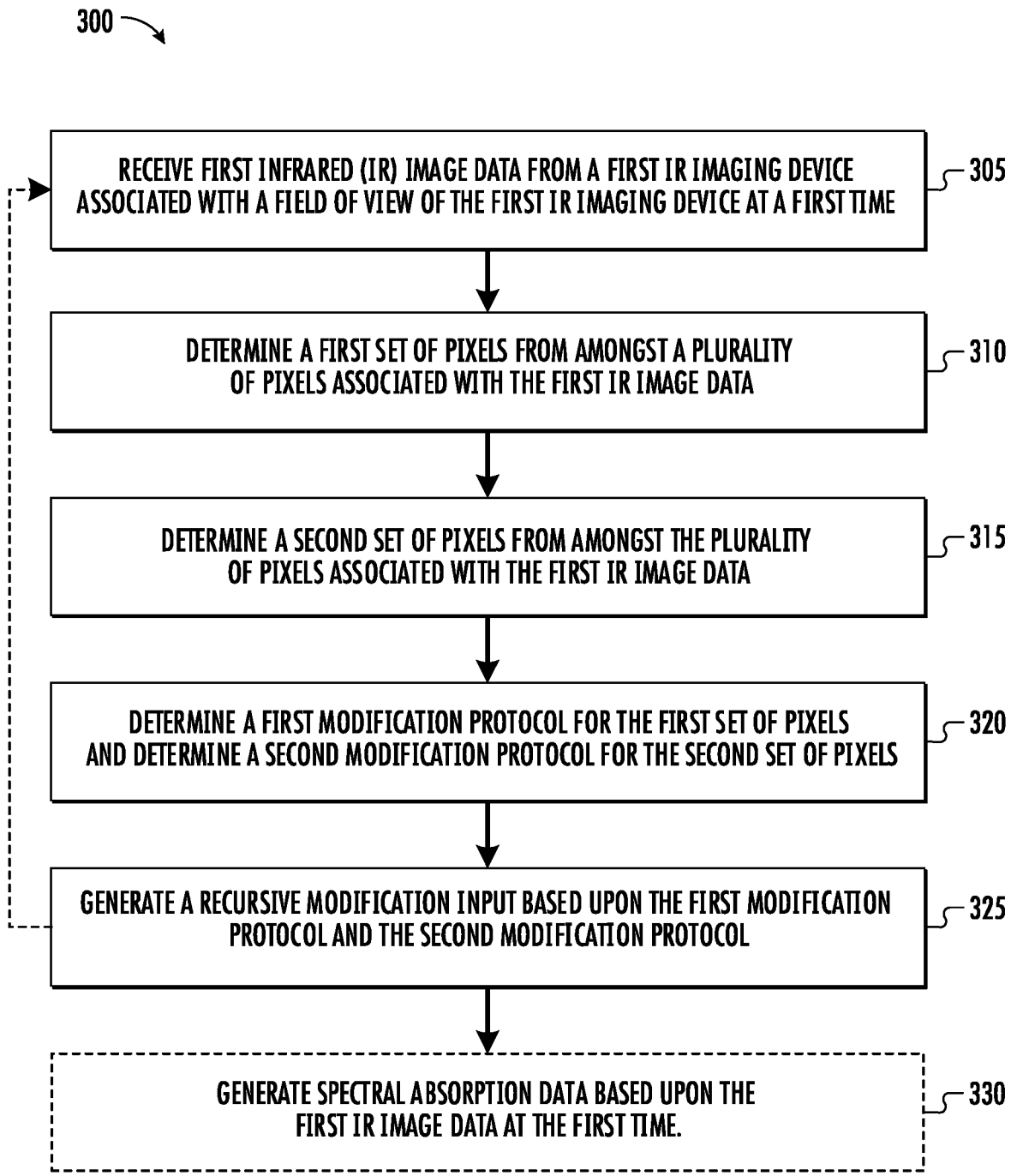
FIG. 3 illustrates an example flowchart for recursive modification generation, in accordance with some example embodiments described herein.
Figure 4:
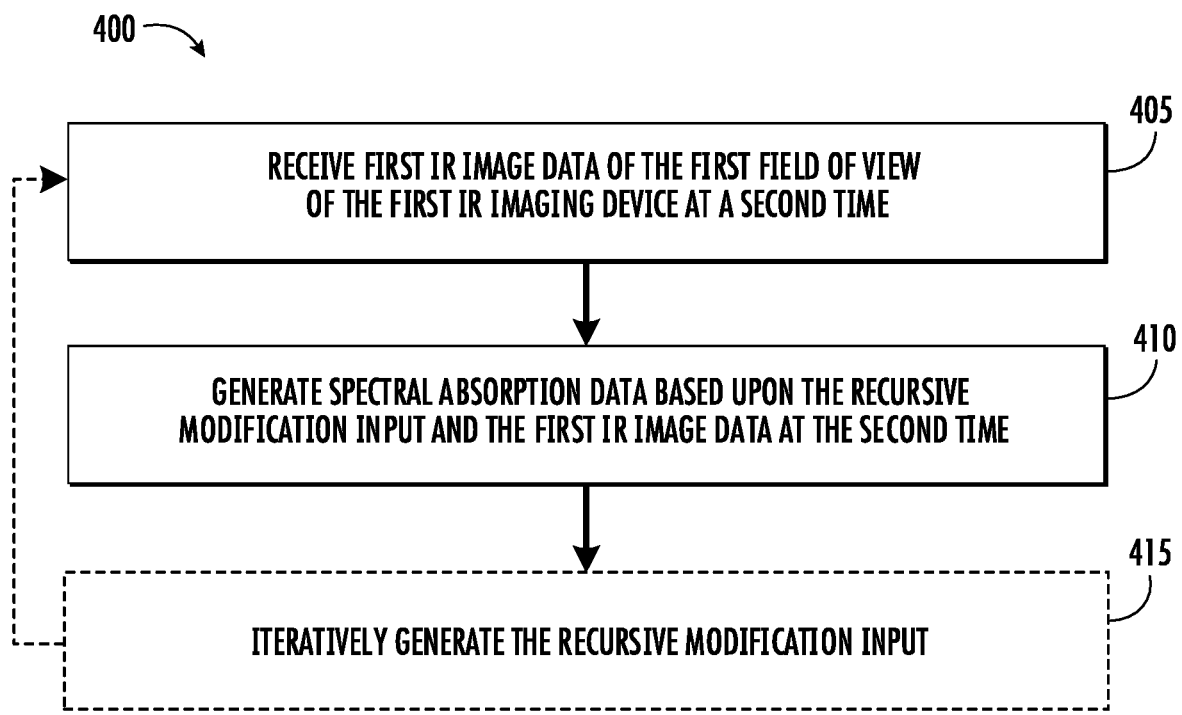
FIG. 4 illustrates an example flowchart for iterative spectral absorption data generation, in accordance with some example embodiments described herein.
Figure 5:
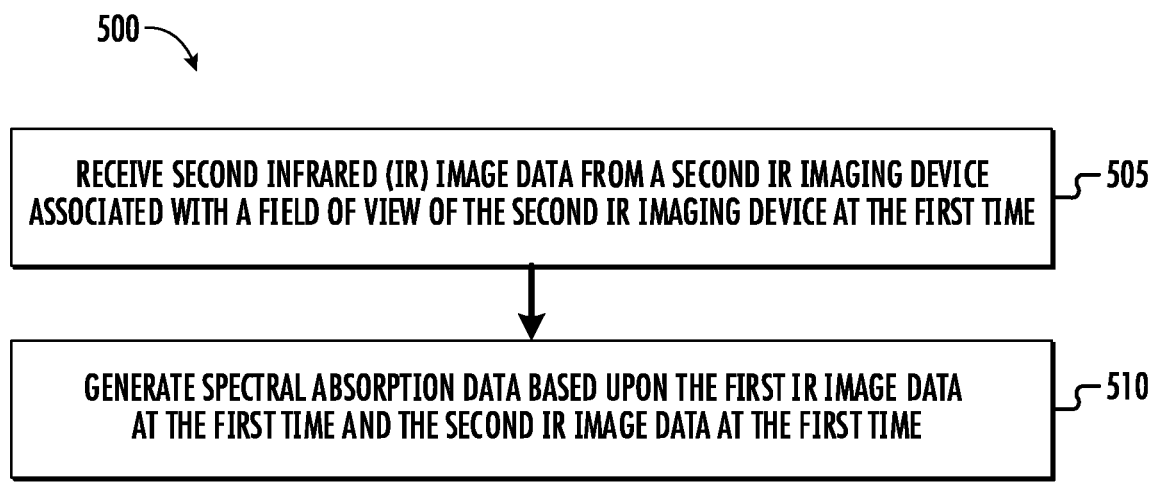
FIG. 5 illustrates an example flowchart for multiple imaging device implementations, in accordance with some example embodiments described herein

As described hereafter with reference to the operations of FIGS. 3-5, the imaging system 100 of the present disclosure may be positioned proximate an emission source 10 (e.g., a pipeline or any feature, vessel, container, etc. from which gas may leak) so as to detect and quantify a fugitive emission 20 emitted from the emission source 10. The positioning may be such that a distance exists between the emission source 10 and, by association, the fugitive emission 20. As would be evident in light of the relative position of the first IR imaging device 102 and the second IR imaging device 104, the first IR image data generated by the first IR imaging device 102 and the second IR image data generated by the second IR imaging device 104 may differ due to the different perspectives (e.g., FOVs 103, 105) of these devices 102, 104. As such, a first feature (e.g., geometric center, center of mass, etc.) or set of features (e.g., corners, edges, contours, etc.) for the fugitive emission 20 in the first IR image data may differ from a second feature (e.g., geometric center, center of mass, etc.) or set of features (e.g., corners, edges, contours, etc.) for the same fugitive emission 20 in the second IR image data. As described hereafter with reference to FIG. 5, the embodiments of the present disclosure may leverage multiple sources of IR image data (e.g., first IR imaging device 102, second IR imaging device 104, etc.) in order to provide a robust solution for thermal spectral absorption data generation. As such, any disparity between the feature(s) of the fugitive emission 20 in the first IR image data and the feature(s) of the fugitive emission 20 in the second IR image data may be determined, accounted for, or otherwise considered in order to ensure accurate spectral absorption data generation.

With continued reference to FIG. 1, the imaging system 100 may include a computing device 200 that is connected with the first IR imaging device 102 and/or the second IR imaging device 104 over a network 106. In some instances, the first IR imaging device 102 may comprise the computing device 200, in whole or in part. In some instances, the second IR imaging device 104 may comprise the computing device 200, in whole or in part. In other instances, the first IR imaging device 102, the second IR imaging device 104, and the computing device 200 may be formed as a single, integrated device. The computing device 200 may include circuitry, networked processors, or the like configured to perform some or all of the apparatus-based (e.g., IR image based) processes described herein and may be any suitable processing device and/or network server. In this regard, the computing device 200 may be embodied by any of a variety of devices. For example, the computing device 200 may be configured to receive/transmit data (e.g., IR image data or the like) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. The computing device 200 may, in some embodiments, comprise several servers or computing devices performing interconnected and/or distributed functions. Despite the many arrangements contemplated herein, the computing device 200 is shown and described herein as a single computing device to avoid unnecessarily overcomplicating the disclosure.

The network 106 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 106 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 106 may include a public network, such as the Internet, a private network, such as an intranet, or combinations thereof, and may utilize a variety of networking protocols now available or later developed including, but not limited to TCP/IP based networking protocols. In some embodiments, the network 106 may refer to a collection of wired connections such that the first IR imaging device 102, the second IR imaging device 104, and/or the computing device 200 may be physically connected, via one or more networking cables or the like.

Figure 2:
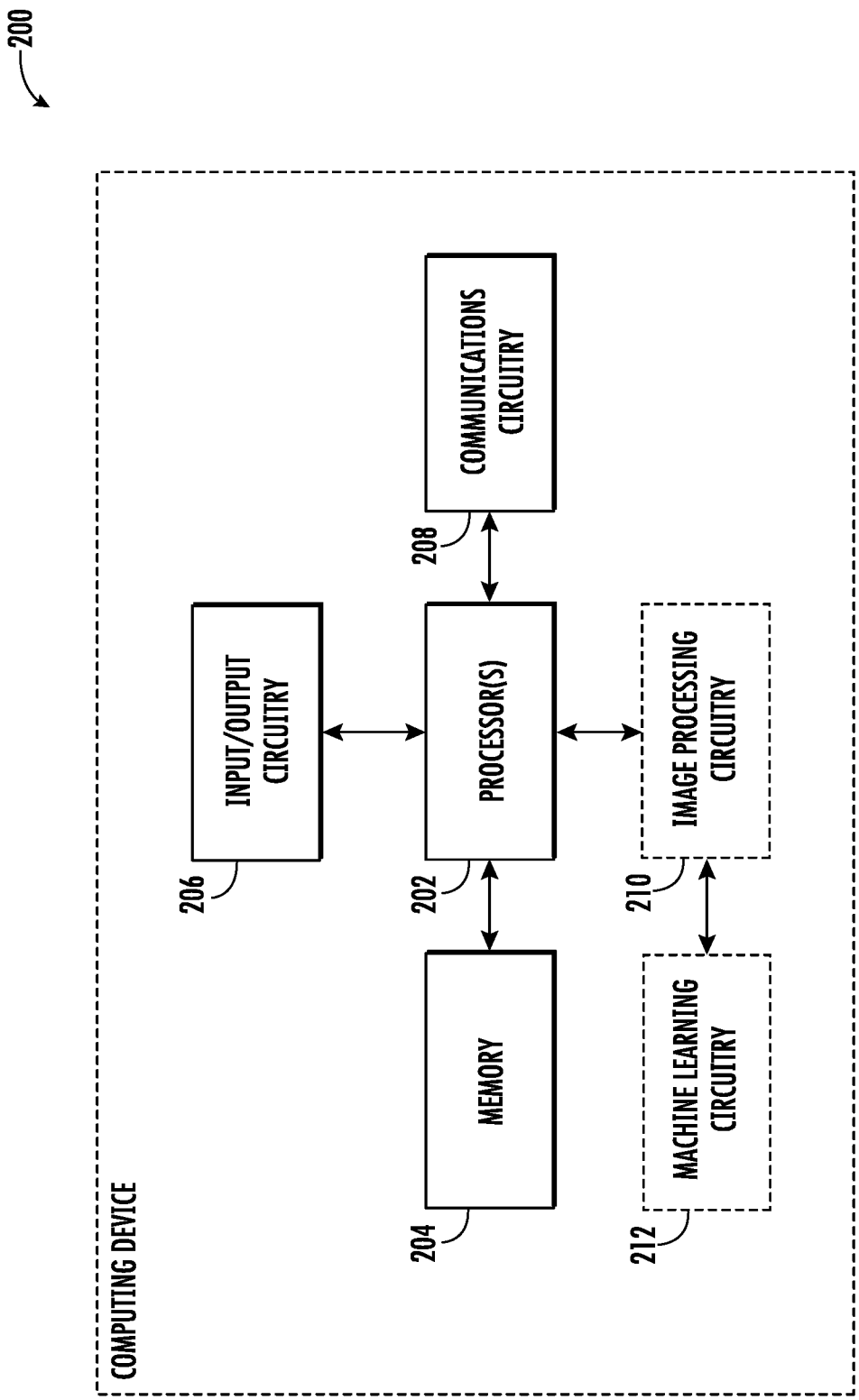
FIG. 2 illustrates a schematic block diagram of example circuitry that may perform various operations, in accordance with some example embodiments described herein.

As illustrated in FIG. 2, the computing device 200 may include a processor 202, a memory 204, input/output circuitry 206, and communications circuitry 208. Moreover, the computing device 200 may include image processing circuitry 210 and/or machine learning circuitry 212. The computing device 200 may be configured to execute the operations described below in connection with FIGS. 3-5. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 200 may be housed within the first IR imaging device 102 and/or the second IR imaging device 104. It will be understood in this regard that some of the components described in connection with the computing device 200 may be housed within one or more of the devices of FIG. 1, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the computing device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the computing device 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The computing device 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality including a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the computing device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The image processing circuitry 210 includes hardware components designed to analyze the first IR image data and/or second IR image data so as to determine or otherwise identify sets of pixels from amongst the plurality of pixels associated with the first IR image data and/or the second IR image data. The image processing circuitry 210 may further determine the presence or absence of an example detection gas associated with particular pixels as part of determining associated modification protocols for the same. Image processing circuitry 210 may utilize processing circuitry, such as the processor 202, to perform its corresponding operations, and may utilize memory 204 to store collected information. In some instances, the image processing circuitry 210 may further include machine learning circuitry 212 that includes hardware components designed to leverage artificial intelligence, supervised learning, unsupervised learning, etc. to analyze IR image data so as to iteratively generate recursive modification inputs for subsequent iterative generation of spectral absorption data. By way of example, machine learning circuitry 212 may comprise or leverage an artificial neural network or convolutional neural network trained on at least a plurality of captured IR image data associated with gas leaks or plumes and/or user confirmation to improve subsequent operation of the operations described herein. The machine learning circuitry 212 may also utilize processing circuitry, such as the processor 202, to perform its corresponding operations, and may utilize memory 204 to store collected information.

It should also be appreciated that, in some embodiments, the image processing circuitry 210 and/or the machine learning circuitry 212 may include a separate processor, specially configured field programmable gate array (FPGA), or application specific interface circuit (ASIC) to perform its corresponding functions. In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of computing device 200.

As described above and as will be appreciated based on this disclosure, embodiments of the present disclosure may be configured as apparatuses, systems, methods, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Detection Recursive Modification Operations

FIG. 3 illustrates a flowchart containing a series of operations for example recursive modification generation. The operations illustrated in FIG. 3 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 305, the apparatus (e.g., computing device 200) includes means, such as processor 202, communications circuitry 208, image processing circuitry 210, or the like, for receiving first infrared (IR) image data from a first IR imaging device 102 associated with a field of view 103 of the first IR imaging device 102 at a first time. The first IR image data generated by the first IR imaging device 102 may include a plurality of data entries, one or more of which may be associated with particular pixels that represent the FOV 103 of the first IR imaging device 102. As shown in FIG. 1, the first IR image data may include one or more data entries associated with the emission source 10 so as to include a background that may exist during an emission event (e.g., the presence of a fugitive emission 20). Said differently, the first IR image data received at operation 305 may refer to IR image data generated by the first IR imaging device 102 in the presence of a fugitive emission 20. For example, the first IR image data may be indicative of the intensity of the IR radiation received by the first IR imaging device 102 for each pixel captured for the FOV 103, including those associated with a background of a potential emission source 10 and/or of a fugitive emission 20 (e.g., a detection gas 20). As would be evident in light of the present disclosure, the first IR image data may occur (e.g., be generated) at a first time in the presence of a fugitive emission 20 so as to determine a set of pixels that are associated with or otherwise indicative of the presence of the fugitive emission 20 (e.g., the detection gas 20). To this end, the imaging system 100 may employ various image processing techniques to determine the presence or the absence of a detection gas (e.g., fugitive emission 20) in the FOV 103 at the first time at which the first IR image data is generated.

In embodiments in which the computing device 200 and the first IR imaging device 102 are contained within a common device or integrated device (e.g., the computing device 200 comprises the first IR imaging device 102), the first IR image data may be received by the computing device 200 as part of normal operation of the first IR imaging device 102 (e.g., an internal transmission, if any). In other embodiments in which the computing device 200 is located separate from the first IR imaging device 102, such as connected via network 106, the computing device 200 may be configured to receive the first IR image data from the first IR imaging device 102 in response to generation of the first IR image data. Said differently, each instance of first IR image data generation may be transmitted to the computing device 200 upon generation. In other embodiments, the computing device 200 may periodically (e.g., according to a defined rate or sampling protocol) request first IR image data from the first IR imaging device 102.

In some embodiments, the first IR imaging device 102 may be configured to iteratively generate first IR image data (e.g., at a first time, at a second time, . . . , at an nth time) of the FOV 103. This iteratively generated first IR image data may be iteratively received by the computing device 200 at operation 305 and may include an associated time stamp indicative of the time at which the first IR image data was generated. Furthermore, the first IR imaging device 102 may move, pan, tilt, or otherwise modify the location at which the first IR imaging device 102 is directed. In doing so, one or more of the plurality of pixels associated with the first IR image data generated at a particular time may change. In such an embodiment, the computing device 200 may receive first IR image data at operation 305 in response to this change in orientation or positioning of the first IR image device 102. In other words, the present disclosure contemplates that the first time at which the first IR image data is generated for receipt by the computing device 200 at operation 305 may refer to first IR image data generated at a time immediately following a reorientation of the first IR imaging device 102 that results in a change in the FOV 103.

Thereafter, as shown in operations 310 and 315, the apparatus (e.g., computing device 200) includes means, such as processor 202, communications circuitry 208, image processing circuitry 210, machine learning circuitry 212, or the like, for determining a first set of pixels from amongst a plurality of pixels associated with the first IR image data and determining a second set of pixels from amongst the plurality of pixels associated with the first IR image data. Each pixel in the first set of pixels may include first IR image data indicative of the presence of a detection gas (e.g., a fugitive emission 20), while each pixel in the second set of pixels may include first IR image data indicative of the absence of the detection gas (e.g., fugitive emission 20). As would be evident in light of the present disclosure, the first IR image data received by the computing device 200 may refer to a hyperspectral image cube in which a given x/y location or position in a traditional red/blue/green (rgb) visual camera also includes various IR radiation values (e.g., lambda 1, lambda 1, etc.) indicative of the intensity of the IR radiation received by the first IR imaging device 102 for each pixel captured for the FOV 103. In order to determine if a particular pixel is indicative of the presence or absence of the detection gas as described herein, the computing device 200 may leverage one or more radiative transfer models, cosine similarity detectors, or the like.

In some embodiments, the computing device 200 may receive or iteratively receive first IR image data of one or more FOVs 103 in instances in which the detection gas (e.g., fugitive emission 20) is absent. In doing so, the computing device 200, via image processing circuitry 210 and/or machine learning circuitry 212, may be trained to determine various properties (e.g., temperature or the like) of the pixels associated with the first IR image data in the absence of the detection gas (e.g., data associated with the background and/or foreground). The computing device 200 may therefore be configured to compare subsequent first IR image data against one or more prior generations of first IR image data generated in the absence of the detection gas so as to determine the presence or absence of the detection gas. For example, first IR image data that is substantially the same (e.g., one or more properties or parameters are substantially the same) as first IR image data generated in the absence of the detection gas may be indicative of the absence of the detection gas, and vice versa. Furthermore, an example cosine similarity detector of the present disclosure may be used and operate as a statistical method to relate continuous and/or categorical predictors (e.g., the rgb values and IR radiation values of the first IR image data) to a single outcome variable (e.g., the presence or absence of the detection gas). In other words, the cosine similarity detector may access or otherwise leverage various instances of IR image data generated by various IR imaging devices at differing times in order to provide a continuous solution for determining, predicting, and/or estimating the foreground/background so as to determine the absence or present of a detection gas (e.g., fugitive emission 20).

Therefore, the determination of the first set of pixels at operation 310 may refer to the comparison of each of the plurality of pixels associated with the first IR image data at the first time, leveraging a cosine similarity detector, radiative transfer model, etc., with one or more prior iterations of the operations described hereafter. By way of example, the computing device 200 may compare the first IR image data for each pixel associated with the FOV 103 at the first time with various prior detections of the presence and/or absence of the detection gas (e.g., fugitive emission 20) and associated thresholds (e.g., similarity determinations, confidence determinations, etc.) in order to assign the subject pixel to the first set of pixels. By way of a particular example, the first IR image data of a subject pixel may include data entries associated with the IR radiation for the subject pixel at a first (e.g., current) time, and the computing device 200 may compare the IR radiation with IR radiation received for the subject pixel, adjacent pixels, and/or any other pixel within the FOV 103 or otherwise to determine that this subject pixel is, for example, indicative of the presence of the detection gas (e.g., fugitive emission).

Similarly, the determination of the second set of pixels at operation 315 may refer to the comparison of each of the plurality of pixels associated with the first IR image data at the first time, leveraging the cosine similarity detector, radiative transfer model, etc., with one or more prior iterations of these operations. By way of example, the computing device 200 may compare the first IR image data for each pixel associated with the FOV 103 at the first time with various prior detections of the presence and/or absence of the detection gas (e.g., fugitive emission 20) and associated thresholds (e.g., similarity determinations, confidence determinations, etc.) in order to assign the subject pixel to the second set of pixels. By way of a particular example, the first IR image data of a subject pixel may include data entries associated with the IR radiation for the subject pixel at the first (e.g., current) time, and the computing device 200 may compare the IR radiation with IR radiation received for the subject pixel, adjacent pixels, and/or any other pixel within the FOV 103 or otherwise to determine that this subject pixel is, for example, indicative of the absence of the detection gas (e.g., fugitive emission).

In some embodiments, determining the second set of pixels at operation 315 may occur in response to the determination of the first set of pixels at operation 310 or otherwise based upon the results of operation 310. By way of example, the computing device 200 at operation 310 may assigned one or more pixels from amongst the plurality of pixels associated with the first IR image data to the first set of pixels indicating that these pixels are indicative of the presence of the detection gas. In such an embodiment, the computing device 200 may assign pixels that are not assigned to the first set of pixels to the second set of pixels. In other words, those pixels not determined at operation 310 to include first IR image data indicative of the presence of a detection gas may conversely be determined to include first IR image data indicative of the absence of the detection gas and, therefore, be determined as part of the second set of pixels. In any embodiment, the computing device 200 may leverage, for example, reinforcement or supervised learning in which a user associated with the imaging system 100 may operate to confirm the presence or absence of the detection gas for a particular pixel so as to improve the determination operations of FIG. 3.

In some embodiments, determining the first set of pixels at operation 310 and/or determining the second set of pixels at operation 315 may leverage determined relationships between pixels. By way of example, if a particular pixel is determined to be indicative of the presence of the detection gas and, therefore, determined to part of the first set of pixels, pixels that are proximate, adjacent, or otherwise near the particular pixel may also be more likely to be indicative of the presence of the detection gas (e.g., fugitive emission 20). By way of an additional example, if a particular pixel is surrounded by adjacent pixels, each of are determined to be a part of the first set of pixels (e.g., indicative of the presence of the detection gas), the likelihood that the particular pixel is indicative of the present of the detection gas is increased relative other pixels. Furthermore, the present disclosure contemplates that the first set of pixels and/or the second set of pixels may further include various subsets of pixels. As would be evident in light of the present disclosure, the confidence of the computing device 200 that a particular pixel is indicative of the presence or the absence of the detection gas (e.g., fugitive emission) may vary amongst pixels. For example, the computing device 200 may, based upon the first IR image data generated at the first time, be more confident that a particular pixel is indicative of the presence of the detection gas as compared to another pixel that is also indicative for the detection gas such that both pixels are assigned to the first set of pixels with different confidence values. Therefore, the first set of pixels may include various subsets of pixels, each of which are indicative of the presence of the detection gas. Although described herein with reference to subsets of pixels within the first set of pixels, the present disclosure contemplates that the second set of pixels may also include various subsets of pixels, each of which are indicative of the absence of the detection gas.

Thereafter, as shown in operation 320, the apparatus (e.g., computing device 200) includes means, such as processor 202, communications circuitry 208, image processing circuitry 210, machine learning circuitry 212, or the like, for determining a first modification protocol for the first set of pixels and determining a second modification protocol for the second set of pixels. In order to improve the gas detection and quantification operations of the imaging system 100, the computing device 200 may operate to determine modification protocols that are pixel specific. As described hereafter with reference to FIG. 4, the computing device 200 may operate to iteratively generate spectral absorption data based upon the IR image data iteratively received from the first IR imaging device. As described above, traditional imaging systems fail to properly account for the impact of gas that may potentially exist in a particular FOV (e.g., gas burn into background) in initial determinations resulting in the inability to properly detect and/or quantify fugitive emissions (e.g. detection gas 20) with such a FOV 103, particularly when an imaging device's FOV 103 is modified. For example, these conventional systems may operate to, in response to first IR image data generated at a second time (e.g., a time after the first time), either substantially replace each prior instance of first IR image data or otherwise fail to consider first IR image data generated at other times.

At operation 320, the embodiments of the present application instead account for the impact of prior instances of first IR image data generation by determining modification protocols for each set of pixels for subsequent generation of a recursive modification input as described hereafter. Said differently, the imaging system 100 of the present disclosure may leverage the output of the operations of FIG. 3 as an input to subsequent operations of the imaging system 100, such as in the generation of spectral absorption data that considers not only first IR image data generated at a current time, but also first IR image data generated at one or more prior times (e.g., the first time or otherwise). For example, the first modification protocol may be determined for the first set of pixels and define a rate at which the IR image data for the one or more pixels in the first set of pixels is replaced. Similarly, the second modification protocol may be determined for the second set of pixels and define a rate at which the IR image data for the one or more pixels in the second set of pixels is replaced. Although described hereafter with reference to a first modification protocol and a second modification protocol that are substantially the same for each pixel in the first set of pixels and each pixel in the second set of pixels, respectively, the present disclosure contemplates that each of these modification protocols may also account for one subsets of pixels within the first set and/or second set of pixels. Said differently, the modification protocol for a particular set of pixels may include different replacement rates for different pixels.

In the embodiments of the present application, the computing device 200 may determine that IR image data indicative of the presence of the detection gas (e.g., fugitive emission 20) at the first time may be more likely to be indicative of the presence of the detection gas at a second or subsequent time. As would be evident by the nature of the detection gases (e.g., fugitive emission 20) described herein, the gas emitted by an example emission source 10 may occur over a period of time (e.g., prior to halting of the leak). As such, the imaging system 100 may determine that pixels indicative of the presence of the detection gas (e.g., pixels of the first set of pixels) are to be updated, replaced, modified, or otherwise addressed less frequently than pixels indicative of the absence of the detection gas (e.g., pixels of the second set of pixels). By way of example, the pixels having IR image data indicative of the absence of the detection gas in the second set of pixels may be updated with each iteration of the operations described herein (e.g., first IR image data generated at a second time, third time, . . . , nth time). As described hereafter with reference to FIG. 4, the computing device 200 may iteratively receive first IR image data from the first IR imaging device 102 at various times and iteratively generate spectral absorption data. In such an embodiment, the computing device 200 may operate to analyze the first IR image data for each pixel of the second set of pixels to determine if the pixels of the second set of pixels are indicative of the presence of the detection gas (e.g., fugitive emission 20) and, therefore, should be assigned to the first set of pixels. Although described herein with reference to an update or replacement of the first IR image data for the pixels in the second set of pixels that occurs at each iteration of the operations of FIG. 3, the present disclosure contemplates that the rate defined by the second modification protocol may include any rate based upon the intended application of the imaging system 100.

The pixels having IR image data indicative of the presence of the detection gas in the first set of pixels, however, may be updated, replaced, modified, or otherwise addressed at a rate than is less frequent than the rate defined by the second modification protocol. As described hereafter with reference to FIG. 4, the computing device 200 may iteratively receive first IR image data from the first IR imaging device 102 at various times and iteratively generate spectral absorption data. In such an embodiment, the computing device 200 may operate to analyze the first IR image data for each pixel of the first set of pixels to determine if the pixels of the first set of pixels continue to be indicative of the presence of the detection gas (e.g., fugitive emission 20) and, therefore, should be remain assigned to the first set of pixels. The frequency at which the first IR image data of the first set of pixels is analyzed, however, may be less frequent than that of the second set of pixels due to the potential likelihood that the first IR image data of the first set of pixels continues to be indicative of the presence of the detection gas. By way of example, while the second modification protocol may define a replacement rate in which the first IR image data associated with the second set of pixels is analyzed at each iteration (e.g., each subsequent generation of first IR image data), the first modification protocol may define a replacement rate in which the first IR image data associated with the first set of pixels is analyzed at every other, every third, . . . , and/or every nth iteration.

The present disclosure contemplates that the rate at which the first IR image data associated with the pixels of the first set of pixels is replaced may vary based upon the intended application of the imaging system 100, based upon a user or operator input, based upon instructions from the computing device 200, and/or the like. For example, the rate at which the IR image data for the one or more pixels in the first set of pixels is replaced may be dependent upon the rate at which the IR image data for the one or more pixels in the second set of pixels is replaced. For example, if the second modification protocol modifies the rate associated with the second set of pixels (e.g., decreases the frequency defined by this rate), the rate associated with the first set of pixels may be similarly modified. Furthermore, the present disclosure contemplates that the embodiments described herein may account for instances in which the first modification protocol and/or the second modification protocol are refreshed, zeroed, etc., such as instances in which the imaging system 100 determines that each pixel associated with the first IR image data is indicative of the presence or the absence of the detection gas (e.g., fugitive emission 20). For example, an operator of the imaging system 100, as part of a reinforcement learning technique or otherwise, may provide instructions to the computing device that a detection gas is present in one or more of the pixels associated with the pixels associated with the first IR image data (e.g., an emission event or otherwise) such that the first modification protocol and/or the second modification protocol are refreshed, zeroed, etc.

As shown in operation 325, the apparatus (e.g., computing device 200) includes means, such as processor 202, communications circuitry 208, image processing circuitry 210, machine learning circuitry 212, or the like, for generating a recursive modification input based upon the first modification protocol and the second modification protocol. As described hereafter with respect to FIG. 4, the imaging system 100 may be configured to iteratively generate IR image data (e.g., first IR image data generated at an example second or subsequent time) that leverages the rates defined by the first modification protocol and/or the second modification protocol. As such, the computing device 200 may generate a recursive modification input based upon the first modification protocol and the second modification protocol that operates as an additional input the system. For example, the computing device 200 may leverage a Kalman filter that receives first IR image data as an input alongside the recursive modification input (e.g., the results of the operations of FIG. 3) so as to improve the detection and/or quantification of the detection gas as described herein. Although described herein with reference to an example Kalman filter, the present disclosure contemplates that other techniques or mechanism for background/foreground consideration (e.g., MOG2, GSOC, and the like) may be leveraged by the embodiments described herein.

In some embodiments, as shown in operation 330, the apparatus (e.g., computing device 200) includes means, such as processor 202, communications circuitry 208, image processing circuitry 210, machine learning circuitry 212, or the like, for generating spectral absorption data based upon the first IR image data at the first time. The spectral absorption data (e.g., absorption cube or the like) may operate as the output of the imaging system 100, for example, as to be reviewed by an operator of the imaging system 100. As described above, the first IR image data received by the computing device 200 may refer to a hyperspectral image cube in which a given x/y location or position in a traditional red/blue/green (rgb) visual camera also includes various IR radiation values (e.g., lambda 1, lambda 1, etc.) indicative of the intensity of the IR radiation received by the first IR imaging device 102 for each pixel captured for the FOV 103. Radiative transfer may refer to the energy transfer in the form of electromagnetic radiation that propagates through an environment and is affected by absorption, emission, and/or scattering. As would be evident in light of the present disclosure, the spectral absorption data may refer to the spectrum of absorption lines, bands, etc. that may result from the radiation (e.g., light) produced by a heated source (e.g., having a temperature differential with an ambient environment of the source. The source (e.g., fugitive emission 20) that produces a continuous spectrum passes through a relatively cooler gas, and the associated absorption spectrum is indicative of the fraction of incident electromagnetic radiation absorbed by the material over a range of frequencies. Such a spectrum as associated with the spectral absorption data, may be used as described in operation 330 as an overall output of the imaging system 100.

FIG. 4 illustrates a flowchart containing a series of operations for iterative spectral absorption data generation. The operations illustrated in FIG. 4 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 405, the apparatus (e.g., computing device 200) includes means, such as processor 202, communications circuitry 208, image processing circuitry 210, or the like, for receiving first infrared (IR) image data from a first IR imaging device 102 associated with a field of view 103 of the first IR imaging device 102 at a second time. Similar to operation 305 above, The first IR image data generated by the first IR imaging device 102 may include a plurality of data entries, one or more of which may be associated with particular pixels that represent the FOV 103 of the first IR imaging device 102 at the second time. In embodiments in which the computing device 200 and the first IR imaging device 102 are contained within a common device or integrated device (e.g., the computing device 200 comprises the first IR imaging device 102), the first IR image data may be received by the computing device 200 as part of normal operation of the first IR imaging device 102 (e.g., an internal transmission, if any). In other embodiments in which the computing device 200 is located separate from the first IR imaging device 102, such as connected via network 106, the computing device 200 may be configured to receive the first IR image data from the first IR imaging device 102 in response to generation of the first IR image data at the second time. Said differently, each instance of first IR image data generation may be transmitted to the computing device 200 upon generation. In other embodiments, the computing device 200 may periodically (e.g., according to a defined rate or sampling protocol) request first IR image data from the first IR imaging device 102.

Thereafter, as shown in operation 410, the apparatus (e.g., computing device 200) includes means, such as processor 202, communications circuitry 208, image processing circuitry 210, machine learning circuitry 212, or the like, for generating spectral absorption data based upon the recursive modification input and the first IR image data at the second time. As detailed herein, the embodiments of the present disclosure may be recursive or otherwise continuous in that prior instances of generated first IR image data may be used in conjunction with the current generation of first IR image data to improve the detection and/or quantification of detection gases (e.g., fugitive emissions 20). As such, at operation 410, the computing device 200 may, via a Kalman filter or the like as noted above, receive first IR image data generated at a second time as an input as well as the recursive modification input as an input to generate spectral absorption data. For example, the computing device 200 may receive first IR image data generated at a second time that includes first IR image data associated with the FOV 103 of the imaging system 100 at the second time. Based upon the first modification protocol and the second modification protocol of the recursive modification input, the computing device 200 may update, replace, modify or otherwise address first IR image data generated at the second time on a pixel-by pixel basis in that pixels of the second set of pixels may be updated, replaced, modified, or otherwise addressed at a frequency that is greater than that of the pixels of the first set of pixels. By way of a particular, non-limiting example, the computing device 200 may generate spectral absorption data for each of the pixels associated with the first IR image data; however, the spectral absorption data for some pixels (e.g., pixels of the first set) may only be based upon prior instances of first IR image data (e.g., first IR image data generated at the first time used to generate the recursive modification input).

In some embodiments, as shown in operation 415, the apparatus (e.g., computing device 200) includes means, such as processor 202, communications circuitry 208, image processing circuitry 210, machine learning circuitry 212, or the like, for iteratively generating the recursive modification input. The computing device 200 may iteratively generate the recursive modification input for iterative generation of spectral absorption data based upon the iteratively generated recursive modification input and the iteratively generated first IR image data as shown in FIG. 4. For example, the computing device 200 may receive first IR image data generated at a plurality of subsequent times (e.g., a third time, a fourth time, ..., and/or an nth time) and perform the operations of FIGS. 3-4 iteratively so as to provide a recursive and continuous mechanism for improved gas detection and quantification. The present disclosure contemplates that this iterative, recursive operation of FIGS. 3-4 may occur at any rate or frequency based upon the intended application of the imaging system 100.

FIG. 5 illustrates a flowchart containing a series of operations for multiple device implementations. The operations illustrated in FIG. 5 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 505, the apparatus (e.g., computing device 200) includes means, such as processor 202, communications circuitry 208, image processing circuitry 210, or the like, for receiving second infrared (IR) image data from a second IR imaging device 104 associated with a field of view 105 of the second IR imaging device 104 at the first time. Similar to operation 305, the second IR image data generated by the second IR imaging device 104 may include a plurality of data entries, one or more of which may be associated with particular pixels that represent the FOV 105 of the second IR imaging device 104. As shown in FIG. 1, the second IR image data may include one or more data entries associated with or otherwise indicative of a potential emission source 10. For example, the second IR image data may also be indicative of the intensity of the IR radiation received by the second IR imaging device 104 for each pixel captured for the FOV 105. In embodiments in which the computing device 200 and the second IR imaging device 104 are contained within a common device or integrated device (e.g., the computing device 200 comprises the second IR imaging device 104), the second IR image data may be received by the computing device 200 as part of normal operation of the second IR imaging device 104 (e.g., an internal transmission, if any). In other embodiments in which the computing device 200 is located separate from the second IR imaging device 104, such as connected via network 106, the computing device 200 may be configured to receive the second IR image data from the second IR imaging device 104 in response to generation of the second IR image data. Said differently, each instance of second IR image data generation may be transmitted to the computing device 200 upon generation. In other embodiments, the computing device 200 may periodically (e.g., according to a defined rate or sampling protocol) request second IR image data from the second IR imaging device 104.

As shown in operation 510, the apparatus (e.g., computing device 200) includes means, such as processor 202, communications circuitry 208, image processing circuitry 210, or the like, for generating spectral absorption data based upon the first IR image data at the first time and the second IR image data at the first time. As would be evident in light of the relative positioning between the first IR imaging device 102 and the second IR imaging device 104, one or more pixels associated with the first IR image data may be similarly associated with the second IR image data. In order to provide additional data sources so as to improve the generation of spectral absorption data, the imaging system 100 may leverage second IR image data in conjunction with the first IR image data. As such the computing device 200 may operate to refine spectral absorption data generation based upon an increased dataset (e.g., a higher confidence output). Although described herein with reference to a second IR imaging device 104 and associated second IR image data, the present disclosure contemplates that data inputs from a variety of additional sources including additional broadband IR image data, visual image data (e.g., VIS and/or rgb data), and/or the like may be used to further improved upon the operations described above with reference to FIGS. 3-5.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the computing device 200 and executed by a processor 202 of the computing device 200.

As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

The invention claimed is:

1. A computing device comprising at least one processor and at least one non-transitory memory comprising program code, wherein the at least one non-transitory memory and the program code are configured to, with the at least one processor, cause the computing device to:
   receive initial first infrared image data from a first infrared imaging device, wherein the initial first infrared image data is generated at a first time;
   determine a plurality of pixels in the initial first infrared image data;
   determine a plurality of modification protocols that defines different replacement rates for analyzing different sets of pixels of the plurality of pixels in the initial first infrared image data;
   receive subsequent first infrared image data from the first infrared imaging device, wherein the subsequent first infrared image data is generated at a second time subsequent to the first time; and
   generate spectral absorption data based at least in part on the different replacement rates associated with the different sets of pixels in the initial first infrared image data and the subsequent first infrared image data.

2. The computing device of claim 1, wherein a first portion of the spectral absorption data for a first set of the plurality of pixels is based on the initial first infrared image data, wherein a second portion of the spectral absorption data for a second set of the plurality of pixels is based on the subsequent first infrared image data.

3. The computing device of claim 1, wherein the plurality of pixels comprises a first set of pixels that is indicative of a presence of a detection gas.

4. The computing device of claim 3, wherein the at least one non-transitory memory and the program code are configured to, with the at least one processor, cause the computing device to:
   determine a second set of pixels from the plurality of pixels; and
   determine a first modification protocol and a second modification protocol that define a first replacement rate and a second replacement rate, respectively.

5. The computing device of claim 4, wherein the second set of pixels is indicative of an absence of the detection gas.

6. The computing device of claim 1, wherein the different replacement rates comprise:
   a first replacement rate for analyzing a first set of pixels in the initial first infrared image data, and
   a second replacement rate for analyzing a second set of pixels in the initial first infrared image data, wherein the first replacement rate is less frequent than the second replacement rate.

7. The computing device of claim 1, wherein the at least one non-transitory memory and the program code are configured to, with the at least one processor, cause the computing device to:
   receive second infrared image data from a second infrared imaging device; and
   generate the spectral absorption data based further upon the second infrared image data.

8. A computer-implemented method comprising:
   receiving initial first infrared image data from a first infrared imaging device, wherein the initial first infrared image data is generated at a first time;
   determining a plurality of pixels in the initial first infrared image data;
   determining a plurality of modification protocols that defines different replacement rates for analyzing different sets of pixels in the plurality of pixels in the initial first infrared image data;
   receiving subsequent first infrared image data from the first infrared imaging device, wherein the subsequent first infrared image data is generated at a second time subsequent to the first time; and
   generating spectral absorption data based at least in part on the different replacement rates associated with the different sets of pixels in the initial first infrared image data and the subsequent first infrared image data.

9. The computer-implemented method of claim 8, wherein a first portion of the spectral absorption data for a first set of the plurality of pixels is based on the initial first infrared image data, wherein a second portion of the spectral absorption data for a second set of the plurality of pixels is based on the subsequent first infrared image data.

10. The computer-implemented method of claim 8, wherein the plurality of pixels comprises a first set of pixels that is indicative of a presence of a detection gas.

11. The computer-implemented method of claim 10, further comprising:
    determining a second set of pixels from the plurality of pixels; and
    determining a first modification protocol and a second modification protocol that define a first replacement rate and a second replacement rate, respectively.

12. The computer-implemented method of claim 11, wherein the second set of pixels is indicative of an absence of the detection gas.

13. The computer-implemented method of claim 8, wherein the different replacement rates comprise:
    a first replacement rate for analyzing a first set of pixels in the initial first infrared image data, and
    a second replacement rate for analyzing a second set of pixels in the initial first infrared image data, wherein the first replacement rate is less frequent than the second replacement rate.

14. The computer-implemented method of claim 8, further comprising:
    receiving second infrared image data from a second infrared imaging device; and
    generating the spectral absorption data based further upon the second infrared image data.

15. A computer program product comprising at least one non-transitory computer-readable storage medium having computer program code thereon that, in execution with at least one processor, configures the computer program product for:
- receiving initial first infrared image data from a first infrared imaging device, wherein the initial first infrared image data is generated at a first time;
- determining a plurality of pixels in the initial first infrared image data;
- determining a plurality of modification protocols that defines different replacement rates for analyzing different sets of pixels of the plurality of pixels in the initial first infrared image data;
- receiving subsequent first infrared image data from the first infrared imaging device, wherein the subsequent first infrared image data is generated at a second time subsequent to the first time; and
- generating spectral absorption data based at least in part on the different replacement rates associated with the different sets of pixels in the initial first infrared image data and the subsequent first infrared image data.

16. The computer program product of claim 15, wherein a first portion of the spectral absorption data for a first set of the plurality of pixels is based on the initial first infrared image data, wherein a second portion of the spectral absorption data for a second set of the plurality of pixels is based on the subsequent first infrared image data.

17. The computer program product of claim 15, wherein the plurality of pixels comprises a first set of pixels that is indicative of a presence of a detection gas.

18. The computer program product of claim 17, wherein the computer program code, in execution with the at least one processor, configures the computer program product for:
- determining a second set of pixels from the plurality of pixels; and
- determining a first modification protocol and a second modification protocol that define a first replacement rate and a second replacement rate, respectively.

19. The computer program product of claim 18, wherein the second set of pixels is indicative of an absence of the detection gas.

20. The computer program product of claim 15, wherein the different replacement rates comprise:
- a first replacement rate for analyzing a first set of pixels in the initial first infrared image data, and
- a second replacement rate for analyzing a second set of pixels in the initial first infrared image data, wherein the first replacement rate is less frequent than the second replacement rate.

* * * * *